United States Patent [19]

Hasegawa et al.

[11] Patent Number: 5,635,900

[45] Date of Patent: Jun. 3, 1997

[54] ANTITHEFT APPARATUS FOR AUTOMOTIVE VEHICLE AND METHOD OF REGISTERING ID NO. THEREIN

[75] Inventors: Shunichi Hasegawa, Machida; Yoshiki Onuma, Ebina, both of Japan

[73] Assignee: Nissan Motor Co., Ltd., Kanagawa-ken, Japan

[21] Appl. No.: 423,482

[22] Filed: Apr. 19, 1995

[30] Foreign Application Priority Data

Apr. 20, 1994 [JP] Japan .................................. 6-081778

[51] Int. Cl.⁶ ...................................................... B60R 25/10
[52] U.S. Cl. ................ 340/426; 340/825.31; 340/825.72
[58] Field of Search ......................... 340/825.31, 825.32, 340/825.54, 825.69, 825.72, 426; 307/10.2

[56] References Cited

U.S. PATENT DOCUMENTS

| | | | |
|---|---|---|---|
| 4,990,906 | 2/1991 | Kell et al. | 340/825.32 |
| 5,043,593 | 8/1991 | Tsutsumi et al. | 307/10.2 |
| 5,278,547 | 1/1994 | Suman et al. | 340/825.32 |
| 5,376,932 | 12/1994 | Samokine et al. | 340/825.54 |
| 5,416,471 | 5/1995 | Trehame et al. | 340/825.31 |
| 5,422,632 | 6/1995 | Bucholtz et al. | 340/825.31 |
| 5,455,571 | 10/1995 | Janssen | 340/825.31 |
| 5,461,386 | 10/1995 | Knebelkamp | 340/825.31 |

*Primary Examiner*—Jeffery Hoffsass
*Assistant Examiner*—Timothy Edwards, Jr.
*Attorney, Agent, or Firm*—Lowe, Price, LeBlanc & Becker

[57] ABSTRACT

An antitheft apparatus for an automotive vehicle comprises: a transponder (1) buried in an ignition key to store an ID number thereof; a transmit and receive unit (2) provided in an ignition key cylinder to receive the ID number of the ignition key inserted into the ignition key cylinder; and an immobilizer unit (3) for, in antitheft mode, collating the received ID number with a number of stored ID numbers, and outputting an engine start enable signal when the received ID number matches one of the stored ID numbers and an engine start disable signal when does not match. In particular, the immobilizer unit (3) releases an ID number register mode into the antitheft mode automatically, when the received ID number is read twice successively by the transmit/receive unit or when is the same as one of the already stored ID numbers. On the other hand, after any given number of ID numbers have been registered, the ID number register mode can be also released automatically. Therefore, the ID number register mode can be released automatically after any given number of ID numbers has been registered.

23 Claims, 2 Drawing Sheets

ANTITHEFT APPARATUS FOR AUTOMOTIVE VEHICLE AND METHOD OF REGISTERING ID NO. THEREIN

BACKGROUND OF THE INVENTION

1. Technical Field

The present invention relates to an antitheft apparatus for an automotive vehicle for preventing the vehicle from being stolen by use of an ID (identification) number allocated to each ignition key, and in particular to a method of registering an ID number of an ignition key to the antitheft apparatus.

2. Description of the Related Art

An antitheft apparatus for an automotive vehicle has been known. In this antitheft apparatus, a transponder is buried at a head portion of an ignition key, and a specific ID number is stored in the transponder. When the ignition key is inserted into a key hole of a key cylinder and then rotated to a start position to drive an engine of the vehicle, the ID number is read from the ignition key and then collated with a plurality of ID numbers already registered in the antitheft apparatus. Here, if the ID number of the key now used has been already registered in the antitheft apparatus, the engine can be started. On the other hand, if not registered, the engine cannot be started for prevention of vehicle from being stolen.

In the conventional antitheft apparatus, the ID number has been registered as follows: First, a diagnostic tester is connected to the antitheft apparatus, and a register mode switch is turned on to set the antitheft apparatus to a register mode. After that, the key is inserted into an ignition key cylinder and then rotated to an ignition-on (IGN ON) position. Under these conditions, since an ID number specific to the inserted key is read and then stored in a non-volatile memory of the antitheft apparatus. The above-mentioned procedure is repeated. When the repeated procedure reaches the maximum registration number N, the register mode is released automatically, so that N-units of keys having different ID numbers can be registered, respectively.

In the conventional antitheft apparatus, however, there exists a problem in that once the antitheft apparatus is set to the ID number register mode, the register mode cannot be released until the maximum ID number N of the ignition keys are registered in the antitheft apparatus.

SUMMARY OF THE INVENTION

Accordingly, it is the object of the present invention to provide an antitheft apparatus for an automotive vehicle whose register mode can be released easily or automatically after any given number of ID numbers have been registered therein.

To achieve the above-mentioned object, the present invention provides an antitheft apparatus for an automotive vehicle, comprising: a transponder provided in an ignition key, for storing an ID number of its own ignition key therein; a transmit/receive unit provided in an ignition key cylinder, for transmitting a transmit signal to said transponder to receive the ID number, and for receiving a signal of the ID number of the ignition key inserted into the ignition key cylinder; and an immobilizer unit for, in antitheft mode, collating the received ID number of the ignition key with the ID numbers already stored therein and outputting an engine start enable signal when the received ID number matches one of the stored ID numbers but an engine start disable signal when does not match and for, in ID number register mode, registering the received ID number therein; said immobilizer unit further comprises means for releasing the ID number register mode into the antitheft mode automatically when the received ID number of the ignition key inserted into the ignition key cylinder is received twice successively by said transmit/receive unit or when the received ID number of the ignition key inserted into the ignition key cylinder matches any one of the ID numbers already stored therein.

Further, the present invention provides a method of registering an ID number of an ignition key in an antitheft apparatus, comprising the steps of: checking whether a first ignition key is inserted into an ignition key cylinder and further rotated to an IGN ON position; if YES, transmitting a transmit signal to a transponder of the first ignition key inserted into the ignition key cylinder to receive a first ID number of the first ignition key; registering the received first ID number in a memory as the first ID number; checking whether a second ignition key is set to the IGN ON position; if YES, transmitting the transmit signal to a second transponder of the second ignition key inserted into the ignition key cylinder to receive a second ID number of the second ignition key; checking whether the received second ID number is the same as the first ID number or whether the received second ID number is the same as one of the ID numbers already stored; if YES, releasing an ID number register mode; if NO, storing the second ID number in the memory as the second ID number; checking whether maximum ID numbers have been registered; if NO, repeating the ID number register processing; and if YES, releasing the ID number register mode.

Further, the present invention provides an antitheft apparatus for an automotive vehicle, having: a transponder (1) provided in an ignition key, for storing an ID number of its own ignition key therein; a transmit/receive unit (2) provided in an ignition key cylinder, for transmitting a transmit signal to the transponder to receive the ID number of the ignition key inserted Into the ignition key cylinder; and an immobilizer unit (3) for collating the received ID number of the ignition key with the ID numbers already stored therein and outputting an engine start enable signal when the received ID number matches one of the stored ID numbers but an engine start disable signal when does not match, characterized in that the immobilizer unit (3) further comprises means for registering the received ID number of the ignition key inserted into the ignition key cylinder therein in ID number register mode, but releasing the ID number register mode into antitheft mode automatically when the received ID number of the ignition key inserted into the ignition key is received twice successively by the transmit/receive unit or when the received ID number matches any one of the ID numbers already stored therein.

As described above, in the antitheft apparatus for an automotive vehicle according to the present invention, since the register mode can be released automatically, when the same ID number is read twice successively or when the read ID number has been already registered, it is possible to release the ID number register mode automatically after the ID numbers of any given number of keys have been registered. Further, even if the register mode is not released inadvertently, when the key whose ID number has been already registered is used to start the engine, since the ID register mode can be released automatically, it is possible to securely release the ID number register mode, thus improving the antitheft characteristics of the apparatus.

DETAILED DESCRIPTION OF THE EMBODIMENTS

A basic embodiment of the antitheft apparatus for an automotive vehicle according to the present invention will be described hereinbelow with reference to the attached drawings.

Figure 1:
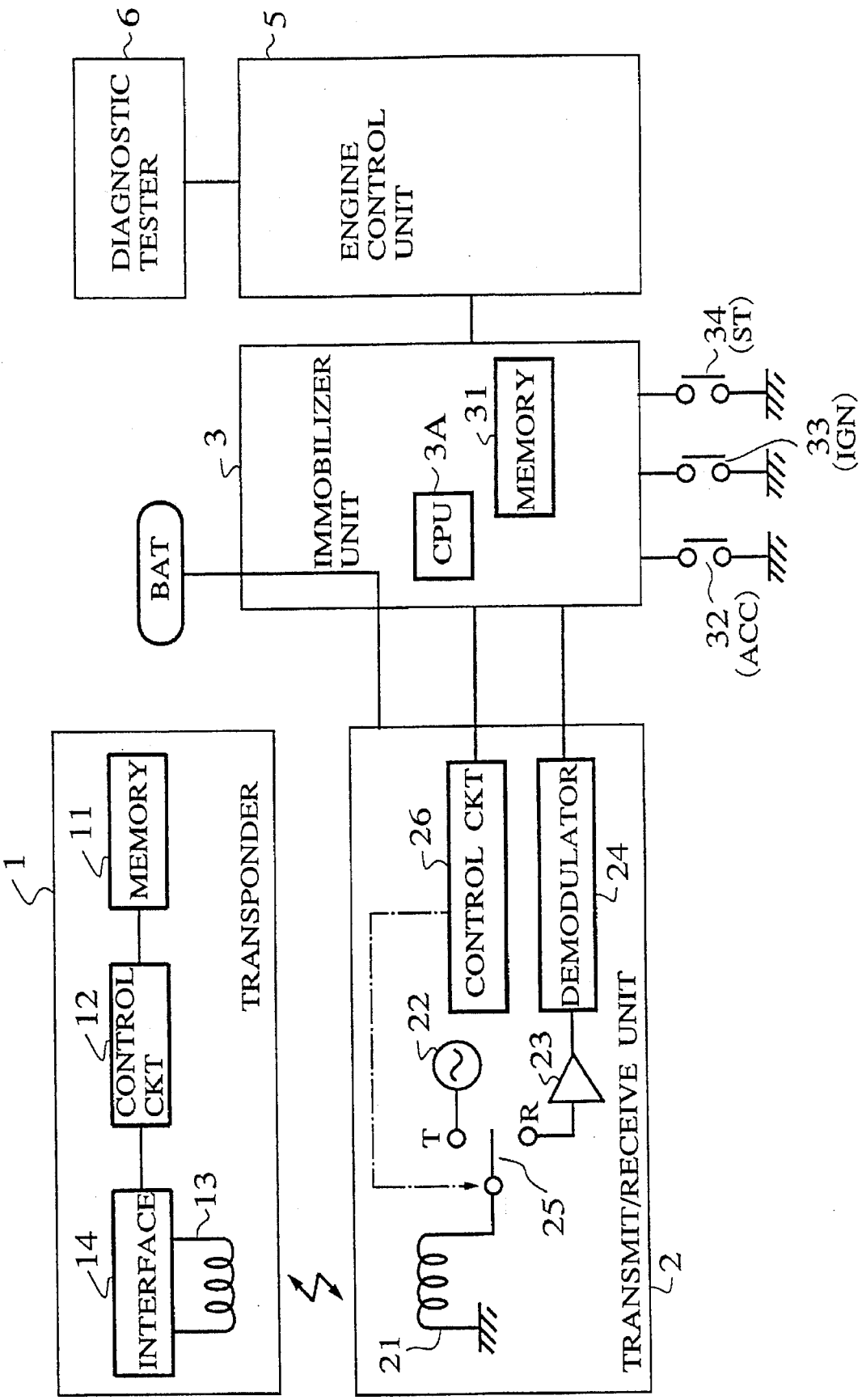
FIG. 1 is a functional block diagram showing an embodiment of the antitheft apparatus according to the present invention.

In FIG. 1, the antitheft apparatus is roughly composed of a transponder 1, a transmit/receive unit 2, and an immobilizer unit 3. Further, an engine control unit 5 is used to control the start and stop of an engine of an automotive vehicle. A diagnostic tester 6 is used to set the immobilizer unit 3 to the ID number register mode through the engine control unit 5.

Figure 2:
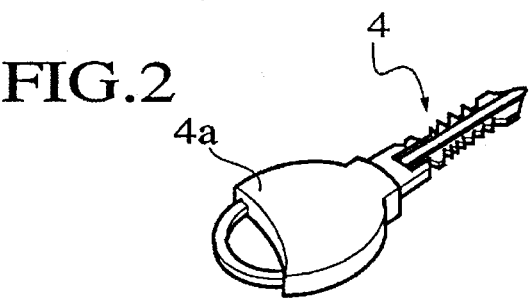
FIG. 2 is a perspective view showing an ignition key used for the antitheft apparatus.

As shown in FIG. 2, the transponder 1 is buried in a head portion 4a of an ignition key 4. The transponder 1 includes a non-volatile memory 11, a control circuit 12, an antenna 13, and an interface 14. The non-volatile memory 11 is an EEPROM (electrically erasable and programmable ROM), for instance for storing an ID (identification) number decided for each ignition key in the form of signals. The control circuit 12 controls the communications between the transponder 1 and the transmit/receive unit 2 via the interface 14. The interface 14 having a capacitor (not shown) therein receives and rectifies a radio wave of a predetermined frequency transmitted from the transmit/receive unit 2, and further stores the rectified signal in the capacitor as a power to transmit the ID number signal of the ignition key from the transponder 1 to the transmit/receive unit 2. In more detail, when the radio wave of the predetermined frequency is transmitted from the transmit/receive unit 2 to the transponder 1, the control circuit 12 reads the ID number signal from the memory 11 and transmits the read ID number signal to the transmit/receive unit 2 disposed on the vehicle side through the interface 14 by use of the power charged in the capacitor of the transponder 1.

On the other hand, the transmit/receive unit 2 is disposed in an ignition key cylinder (not shown) of an automotive vehicle. The transmit/receive unit 2 is composed of an antenna 21, an oscillator 22, an amplifier 23, a demodulator 24, a switch 25 and a control circuit 26. The oscillator 22 generates the pulse radio wave signal of a predetermined frequency to be transmitted to the transponder 1. The amplifier 23 amplifies an ID number signal transmitted from the transponder 1 and received by the antenna 21. The demodulator 24 demodulates the received ID number signal to an ID number. The switch 25 connects the oscillator 22 to the antenna 21 during ID number transmission mode, but connect the amplifier 23 to the antenna 21 in ID number reception mode. The control circuit 26 controls the communications between the transponder 1 and the transmit/receive unit 2 in accordance with commands applied from the immobilizer unit 3. Upon receiving a communication command from the immobilizer unit 3, the control circuit 26 changes over a contact blade of the switch 25 to a T side, to transmit the pulse signal of a predetermined frequency generated by the oscillator 22 to the transponder 1 through the antenna 21 for a predetermined time. The transmission time is determined in such a way sufficient power can be charged into the capacitor of the interface 14 of the transponder 1. After transmission, the contact blade of the switch 25 is immediately changed over to an R side, and the transmit/receive unit 2 receive the signal transmitted from the transponder 1. The received signal is amplified by the amplifier 23 and further demodulated by the demodulator 24 to obtain an ID number.

The immobilizer unit 3 is composed of a microcomputer (CPU) 3A and its peripheral components such as a non-volatile memory 31, and controls the antitheft operation in the antitheft mode and the ID number register operation in the ID number register mode. Further, the immobilizer unit 3 is connected to an ACC (accessary) switch 32 turned on when the key 4 is inserted into the ignition key cylinder and further rotated to the ACC position; an IGN-ON (ignition on) switch 33 turned on when the key 4 is inserted into the ignition key cylinder and further rotated to the IGN ON position; and a ST (start) switch 34 turned on when the key 4 is inserted into the ignition key cylinder and further rotated to the ST position. Further, a power of a battery BAT is supplied to the immobilizer unit 3 and the transmit/receive unit 2 through the immobilizer unit 3.

In the antitheft mode, when an ignition key is inserted into the ignition key cylinder and further rotated to the IGN ON position to start the engine, the microcomputer of the immobilizer unit 3 (referred to as control, hereinafter) reads the ID number of the ignition key inserted into the key cylinder through the transmit/receive unit 2, and collates the read ID number with the ID numbers previously registered in the memory 31. When the ID number of the inserted key matches one of the registered ID numbers, control outputs an engine start enable signal to the engine control unit 5 to start the engine. On the other hand, however, when the ID number of the inserted key does not match one of the registered ID numbers, control outputs an engine start disable signal to the vehicle engine control unit 5 to prevent the vehicle engine from being started.

Further, in the ID number register mode, the diagnostic tester 6 is connected to the engine control unit 5 only when ID numbers of the keys inserted into the key cylinder are required to be registered. That is, when a register mode switch (not shown) of the diagnostic tester 6 is operated to set the antitheft apparatus to the register mode, a register mode start command is transmitted from the diagnostic tester 6 to the immobilizer unit 3 through the engine control unit 5. In response to this register mode start command, the immobilizer unit 3 starts to register the ID numbers of the keys 4 inserted into the key cylinders, in sequence.

The feature of the antitheft apparatus according to the present invention resides in the ID number register operation. Therefore, the ID number register operation will be described hereinbelow in further detail with reference to a flowchart shown in FIG. 3A and 3B.

Figure 3A:
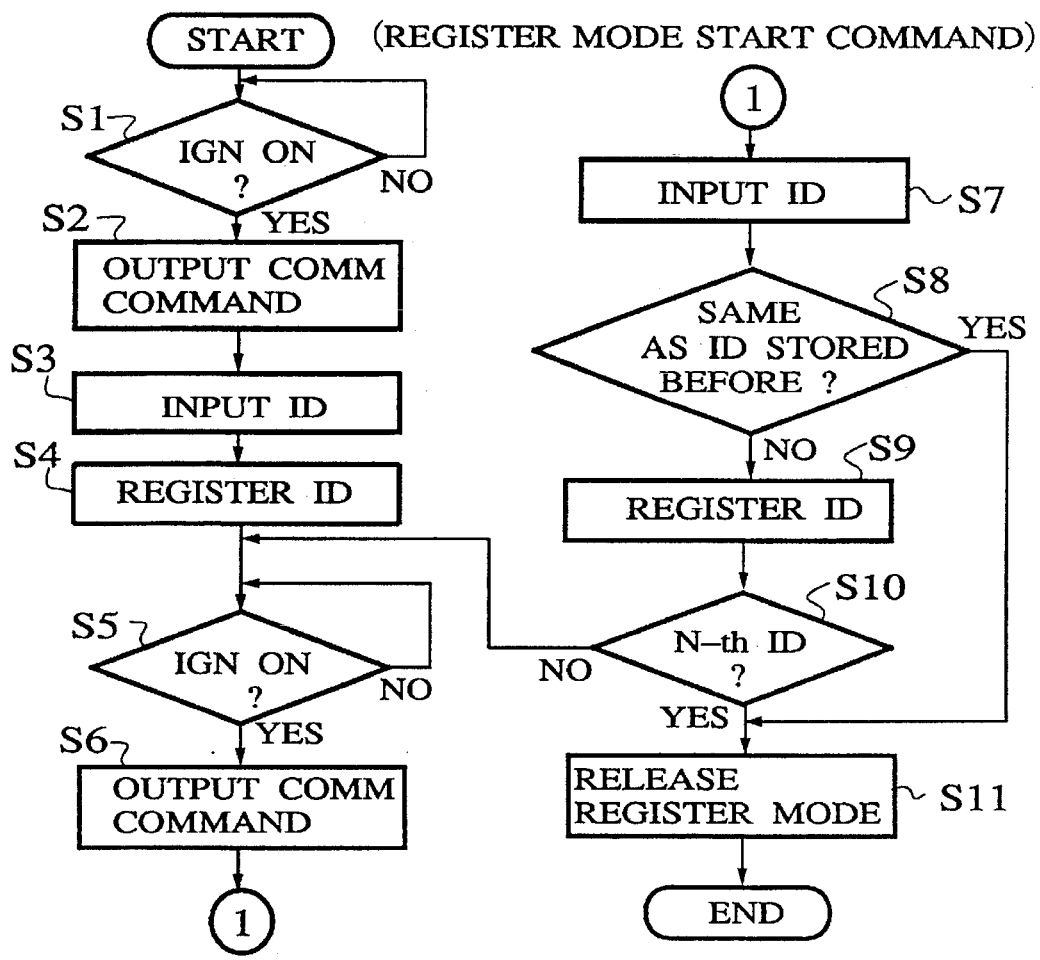
FIG. 3A is a flowchart showing a procedure of an ID number register processing program.

Upon receiving the ID number register mode start command from the diagnostic tester 6 through the engine control unit 5, the microcomputer (CPU) 3A of the immobilizer unit 3 (referred to as control, hereinafter) starts to execute the control program as shown in FIG. 3A.

In step S1, control discriminates whether an ignition key is inserted into the ignition key cylinder and further rotated to the IGN ON position by use of the second switch 33. If YES, control proceeds to step S2.

In step S2, control outputs a communication command to the control circuit 26 of the transmit/receive unit 2. Then, the switch 25 is changed over to the T side, so that the pulse signal of a predetermined frequency generated by the oscillator 22 is transmitted for a predetermined period to the transponder 1 through the antenna 21. The transponder 1 receives this pulse signal through the antenna 13, and the received signal power is charged in the capacitor of the interface 14. By use of this power, an ID number signal stored in the memory 11 is read and further transmitted to the transmit/receive unit 2 through the antenna 13.

In step S3, immediately after the transmission of the pulse signal from the transmit/receive unit 2, since control changes over the switch 25 to the R side, the ID signal transmitted from the transponder 1 is received by the transmit/receive unit 2 through the antenna 21. The received ID signal is amplified by the amplifier 23, and further demodulated to an ID number by the demodulator 24. Therefore, an ID number of the key now inserted into the ignition key cylinder can be obtained from the demodulator 24 of the transmit/receive unit 2.

In step S4, control registers the ID number to the memory 31 of the immobilizer unit 3 as an ID number of a first ignition key.

In step S5, control discriminates whether the ignition key is rotated to the IGN ON position by the IGN ON switch 33.

Here, in step 5 even if the IGN ON switch 33 is turned on again, this does not necessarily indicate that a new second ignition key to be registered is inserted into the ignition key cylinder. When only one ID number of the first ignition key is required to be registered, after the first ID number has been registered, the key is once returned to the OFF position and after that the key is rotated to the IGN ON position again. In other words, registering operation of the same key may be performed twice successively. In other words, in this embodiment, when the IGN ON switch 33 is turned on in step S5, control proceeds to step S6, irrespective of the first and second ignition key.

In step S6, control outputs the communication command to the control circuit 26 of the transmit/receive unit 2 to read a second ID number of the second key, and then proceeds to step S7.

In step S7, control receives the second ID number of the second key through the demodulator 24.

In step S8, control checks whether the second ID number of the key now inserted into the ignition key cylinder is the same as the first ID number already registered in the memory 31. If YES, control proceeds to the step S11; and if NO, control proceeds to step S9.

In step S11, since the ID number of the same key has been registered twice successively, controls decides that the ID number register processing is unnecessary and releases the register mode, so that the ID number register processing is ended.

In step S9, on the other hand, since the second ID number now registered is not the same as the first ID number already registered, controls decides that the second ID number is new and therefore to be registered, so that the new second ID number is registered in the memory 31 of the immobilizer 3.

In step S10, control discriminates whether the number of keys whose ID numbers have been already registered reaches the maximum number N. If YES (N-unit keys have been registered), control proceeds to step S11 to release the register mode, and ends the ID number register processing. If NO, since another ID number can be further registered, control returns to the step S5 to register another ID number of the third key or after.

Figure 3B:
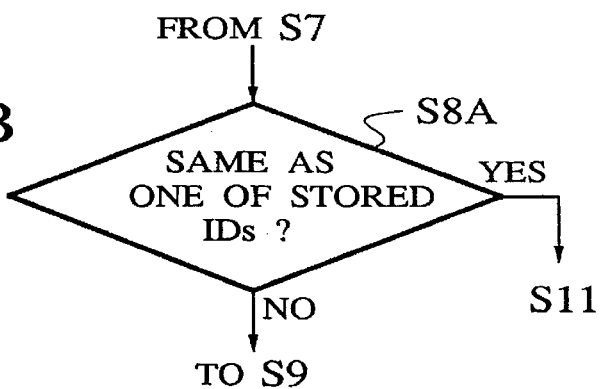
FIG. 3B is a part of the flowchart shown in FIG. 3A for assistance in explaining a modification of the embodiment.

In the above-mentioned embodiment, when the same key has been registered twice successively, the ID register mode is released automatically so that the ID number register processing is ended. Without being limited thereto, however, whenever the ID number of the key inserted into the key cylinder has been already registered, it is possible to release the register mode by another method as follows:

FIG. 3B shows a modification of the embodiment shown in FIG. 3A.

In step S8A, control collates the newly inputted ID number is collated with all the ID numbers already registered in the memory 31. If the newly inputted ID number has been already registered and therefore is the same as one of the already stored ID numbers, control proceeds to step S11 to release the ID register mode. However, if the newly inputted ID number is new and therefore not yet registered in the memory 31, control proceeds to step S9 to register the newly inputted ID number.

Further, in the above-mentioned embodiment, the ID number register mode is set by connecting the diagnostic tester 6 to the engine control unit 5 and further by turning on a register mode witch disposed in the diagnostic tester 6. Without being limited only thereto, however, it is also possible to start the ID number register mode by providing an ID number register start button switch anywhere. In this case, when the immobilizer unit 3 receives this start switch signal, the CPU of the immobilizer unit 3 switches the antitheft operation mode to the ID number register mode, and transmits a control signal to the control circuit 26 of the transmit/receive unit 2.

Further, in the above-mentioned embodiment, although the vehicle driven by an engine has been explained by way of example, it is of course possible to apply the antitheft apparatus according to the present invention to the vehicle driven by another motive power (e.g., electric power). In this case, when an ignition key whose ID number has been already registered is inserted into the ignition key cylinder, a drive-enable signal is outputted to a travel control unit of the motive power. However, when an ignition key whose ID number is not yet registered is inserted into the ignition cylinder, a drive-inhibit signal is outputted to the travel control unit for prevention of the vehicle travel.

As described above, in the antitheft apparatus for an automotive vehicle according to the present invention, since the register mode can be released automatically, when the same ID number is read twice successively or when the read ID number has been already registered, it is possible to release the ID number register mode automatically after the ID numbers of any given number of keys have been registered. Further, even if the register mode is not released inadvertently, when the key whose ID number has been already registered is used to start the engine, since the ID register mode can be released automatically, it is possible to securely release the ID number register mode, thus improving the antitheft characteristics of the apparatus.

What is claimed is:

1. An antitheft apparatus for an automotive vehicle, comprising:

a transponder provided in an ignition key, for storing an ID number of its own ignition key therein;

a transmit/receive unit provided in an ignition key cylinder, for transmitting a transmit signal to said transponder to receive the ID number, and for receiving a signal of the ID number of the ignition key inserted into the ignition key cylinder; and an immobilizer unit for, in antitheft mode, collating the received ID number of the ignition key with ID numbers already stored therein and outputting an engine start enable signal when the received ID number matches one of the stored ID numbers but an engine start disable signal when it does not match and for, in ID number register mode, registering the received ID number therein; said immobilizer unit further comprising means for releasing the ID number register mode; wherein with said immobilizer unit remaining in the ID number register mode after registration of the received ID number, said means releases the ID number register mode into the antitheft mode automatically when the received ID number of the ignition key inserted into the ignition key cylinder is received again and thereby twice successively by said transmit/receive unit.

2. An antitheft apparatus for an automotive vehicle, comprising:
  a transponder provided in an ignition key, for storing an ID number of its own ignition key therein;
  a transmit/receive unit provided in an ignition key cylinder, for transmitting a transmit signal to said transponder to receive the ID number, and for receiving a signal of the ID number of the ignition key inserted into the ignition key cylinder; and
  an immobilizer unit for, in antitheft mode, collating the received ID number of the ignition key with a plurality of ID numbers already stored therein and outputting an engine start enable signal when the received ID number matches one of the stored ID numbers but an engine start disable signal when does not match and for, in ID number register mode, registering the received ID number therein; said immobilizer unit further comprising means for releasing the ID number register mode into the antitheft mode automatically when the received ID number of the ignition key inserted into the ignition key cylinder matches any one of the plurality ID numbers already stored therein.

3. A method of registering an ID number of an ignition key in an antitheft apparatus, comprising the steps of:
  checking whether a first ignition key is inserted into an ignition key cylinder and further rotated to an IGN ON position;
  if the first ignition key is inserted into the ignition key cylinder and further rotated to the IGN ON position, transmitting a transmit signal to a transponder of the first ignition key inserted into the ignition key cylinder to receive a first ID number of the first ignition key;
  registering the received first ID number in a memory as the first ID number;
  checking whether a second ignition key is set to the IGN ON position;
  if the second ignition key is set to the IGN ON position, transmitting the transmit signal to a second transponder of the second ignition key inserted into the ignition key cylinder to receive a second ID number of the second ignition key;
  checking whether the received second ID number is the same as the first ID number;
  if the received second ID number is the same as the first ID number, releasing an ID number registered mode;
  if the received second ID number is not the same as the first ID number, storing the second ID number in the memory as the second ID number;
  checking whether a maximum number of ID numbers have been registered;
  if the maximum number of ID numbers have not been registered, repeating the ID number register processing; and
  if the maximum number of ID numbers have been registered, releasing the ID number register mode.

4. A method of registering an ID number of an ignition key in an antitheft apparatus, comprising the steps of:
  checking whether a first ignition key is inserted into an ignition key cylinder and further rotated to an IGN ON position;
  if the first ignition key is inserted into the ignition key cylinder and further rotated to the IGN ON position, transmitting a transmit signal to a transponder of the first ignition key inserted into the ignition key cylinder to receive a first ID number of the first ignition key;
  registering the received first ID number in a memory as the first ID number;
  checking whether a second ignition key is set to the IGN ON position;
  if the second ignition key is set to the IGN ON position, transmitting the transmit signal to a second transponder of the second ignition key inserted into the ignition key cylinder to receive a second ID number of the second ignition key;
  checking whether the received second ID number is the same as one of ID numbers already stored;
  if the received second ID number is the same as one of ID numbers already stored, releasing an ID number register mode;
  if the received second ID number is not the same as any of ID numbers already stored, storing the second ID number in the memory as the second ID number;
  checking whether maximum ID numbers have been registered;
  if the maximum ID numbers have not been registered, repeating the ID number register processing; and
  if the maximum ID numbers have been registered, releasing the ID number register mode.

5. An antitheft system for an automotive vehicle having an ignition switch and an engine comprising:
  a vehicle ignition key having a transponder for storing a key security code and transmitting a coded signal representing said key security code responsive to a request signal;
  a transceiver operatively connected to said vehicle ignition switch for transmitting said request signal and for receiving said coded signal; and
  a vehicle immobilizer, operatively connected to said transceiver and selectively operable in a registration mode for storing said key security code as a registered security code responsive to receipt of said coded signal and in an antitheft mode for issuing a start signal to enable starting of the vehicle engine responsive to receipt of said coded signal if said coded signal corresponds to said registered security code;
  wherein, with said vehicle immobilizer remaining in the registration mode after storing of the key security code, said vehicle immobilizer is adapted to automatically switch from said registration mode to said antitheft mode responsive to said transceiver receiving said coded signal again and thereby twice in succession.

6. An antitheft system according to claim 5, wherein said vehicle immobilizer is adapted to issue a disable signal in said antitheft mode to prevent starting of the vehicle engine responsive to receipt of said coded signal if said coded signal fails to correspond to said registered security code.

7. An antitheft system according to claim 5, wherein said transceiver transmits said request signal with said vehicle ignition key being inserted into said vehicle ignition switch.

8. An antitheft system according to claim 5, wherein said transceiver transmits said request signal responsive to said vehicle ignition key being inserted into said vehicle ignition switch and said ignition switch being turned to an on position.

9. An antitheft system according to claim 5, wherein said vehicle immobilizer is further adapted to automatically switch from said registration mode to said antitheft mode responsive to said transceiver receiving said coded signal if said key security code has been previously stored as said registered security code.

10. An antitheft system according to claim 5, wherein said vehicle immobilizer is further adapted to store a plurality of registered security codes up to an established maximum number of registered security codes and to automatically switch from said registration mode to said antitheft mode responsive to storage of said key security code as one of said plurality of registered security codes if a count of said plurality of registered security codes stored thereby equals said established maximum number of registered security codes.

11. An antitheft system for an automotive vehicle configured to store a plurality of registered security codes having an ignition switch and an engine comprising:

a vehicle ignition key having a transponder for storing a key security code and transmitting a coded signal representing said key security code responsive to a request signal;

a transceiver operatively connected to said vehicle ignition switch for transmitting said request signal and for receiving said coded signal; and a vehicle immobilizer, operatively connected to said transceiver and selectively operable in a registration mode for storing said key security code as a registered security code responsive to receipt of said coded signal and in an antitheft mode for issuing a start signal to enable starting of the vehicle engine responsive to receipt of said coded signal only if said coded signal corresponds to said registered security code;

wherein said vehicle immobilizer is adapted to automatically switch from said registration mode to said antitheft mode responsive to said transceiver receiving said coded signal if said key security code has been previously stored as said registered security code.

12. An antitheft system according to claim 11, wherein:

said vehicle immobilizer is adapted to issue a disable signal in said antitheft mode to prevent starting of the vehicle engine responsive to receipt of said coded signal if said coded signal fails to correspond to said registered security code; and said transceiver transmits said request signal responsive to said vehicle ignition key being inserted into said vehicle ignition switch and said ignition switch being turned to an on position.

13. An antitheft system for an automotive vehicle having an ignition switch and an engine comprising:

a vehicle ignition key having a transponder for storing a key security code and transmitting a coded signal representing said key security code responsive to a request signal;

a transceiver operatively connected to said vehicle ignition switch for transmitting said request signal and for receiving said coded signal; and a vehicle immobilizer, operatively connected to said transceiver, for storing a plurality of registered security codes up to a maximum number of registered security codes, and selectively operable in a registration mode for storing said key security code as one of said plurality of registered security codes responsive to receipt of said coded signal and in an antitheft mode for issuing a start signal to enable starting of the vehicle engine responsive to receipt of said coded signal if said coded signal corresponds to one of said plurality of registered security codes;

wherein said vehicle immobilizer is further adapted to automatically switch from said registration mode to said antitheft mode responsive to storage of said key security code as one of said plurality of registered security codes if a count of said plurality of registered security codes stored thereby equals said maximum number of registered security codes.

14. An antitheft system according to claim 13, wherein:

said vehicle immobilizer is adapted to issue a disable signal in said antitheft mode to prevent starting of the vehicle engine responsive to receipt of said coded signal if said coded signal fails to correspond to one of said plurality of registered security codes; and said transceiver transmits said request signal responsive to said vehicle ignition key being inserted into said vehicle ignition switch and said ignition switch being turned to an on position.

15. A method of operating an antitheft system for an automotive vehicle having an ignition switch and an engine comprising the steps of:

receiving a coded signal representing a key security code corresponding to a vehicle ignition key; and with the system remaining in a registration mode after storing said key security code, automatically switching from the registration mode, for storing said key security code as a registered security code responsive to receipt of said coded signal, to an antitheft mode, for issuing a start signal to enable starting of the vehicle engine responsive to receipt of said coded signal if said coded signal corresponds to said registered security code, responsive to said coded signal being received again and thereby twice in succession.

16. A method according to claim 15, wherein in said antitheft mode a disable signal is issued to prevent starting of the vehicle engine responsive to receipt of said coded signal if said coded signal fails to correspond to said registered security code.

17. A method according to claim 15, further comprising the step of transmitting said coded signal with said vehicle ignition key inserted into said vehicle ignition switch.

18. A method according to claim 15, further comprising the transmitting said coded signal responsive to said vehicle ignition key being inserted into said vehicle ignition switch and said ignition switch being turned to an on position.

19. A method of operating an antitheft system for an automotive vehicle having an ignition switch and an engine comprising the steps of:

receiving a coded signal representing a key security code corresponding to a vehicle ignition key; and automatically switching from a registration mode, for storing said key security code as a registered security code responsive to receipt of said coded signal, to an antitheft mode, for issuing a start signal to enable starting of the vehicle engine responsive to receipt of said coded signal and said coded signal corresponding to said registered security code, if said key security code has been previously stored as one of a plurality of registered security codes.

20. A method of operating an antitheft system for an automotive vehicle having an ignition switch and an engine comprising the steps of:

storing a number of registered security codes up to a maximum number of registered security codes;

receiving a coded signal representing a key security code corresponding to a vehicle ignition key; and automatically switching from a registration mode, for storing said key security code as one of said number of registered security codes, responsive to receipt of said coded signal, to an antitheft mode, for issuing a start signal to enable starting of the vehicle engine responsive to receipt of said coded signal and said coded signal corresponding to one of said number of registered security codes, if a count of said number of registered security codes stored thereby equals said maximum number of registered security codes which can be stored.

21. An anti-theft system for an automotive vehicle having an ignition switch, operable with an ignition key, and an engine comprising:

a receiver operatively connected to said vehicle ignition switch for receiving a coded signal representing a key security code from a transponder of said vehicle ignition key; and a vehicle immobilizer operatively connected to said receiver and selectively operable in a registration mode for registering said key security code responsive to receipt of said coded signal and in an anti-theft mode for issuing a start signal to enable starting of the vehicle engine responsive to receipt of said coded signal and said coded signal corresponding to a registered security code;

wherein, with the vehicle immobilizer remaining in the registration mode after registering the key security code, said vehicle immobilizer is adapted to automatically switch from said registration mode to said anti-theft mode responsive to said receiver receiving said coded signal again and thereby twice in succession.

22. An anti-theft system for an automotive vehicle having an ignition switch, operable with an ignition key, and an engine comprising:

a receiver operatively connected to said vehicle ignition switch for receiving a coded signal representing a key security code from a transponder of said vehicle ignition key; and a vehicle immobilizer operatively connected to said receiver and selectively operable in a registration mode for registering said key security code, as one of a plurality of registered security codes, responsive to receipt of said coded signal and in an anti-theft mode for issuing a start signal to enable starting of the vehicle engine responsive to receipt of said coded signal and said coded signal corresponding to a registered security code;

wherein said vehicle immobilizer automatically switches from said registration mode to said anti-theft mode responsive to said receiver receiving said coded signal and said key security code being previously registered.

23. An anti-theft system for an automotive vehicle having an ignition switch, operable with an ignition key, and an engine comprising:

a receiver operatively connected to said vehicle ignition switch for receiving a coded signal representing a key security code from a transponder of said vehicle ignition key; and a vehicle immobilizer operatively connected to said receiver and selectively operable in a registration mode for registering said key security code as one of a plurality of registered security codes responsive to receipt of said coded signal and in an antitheft mode for issuing a start signal to enable starting of the vehicle engine responsive to receipt of said coded signal and said coded signal corresponding to one of said plurality of registered security codes;

wherein said vehicle immobilizer automatically switches from said registration mode to said anti-theft mode responsive to registration of said key security code as one of said plurality of registered security codes if a count of said plurality of registered security codes thereby equals an established maximum number of registered security codes.

\* \* \* \* \*